US007689686B2

(12) United States Patent
Gunawardena et al.

(10) Patent No.: US 7,689,686 B2
(45) Date of Patent: Mar. 30, 2010

(54) ACTIVE PROBING FOR SUSTAINABLE CAPACITY ESTIMATION OF NETWORKED DATAFLOWS

(75) Inventors: Dinan S. Gunawardena, Cambridge (GB); Laurent Massoulie, Cambridge (GB); Peter B. Key, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1785 days.

(21) Appl. No.: 10/696,780

(22) Filed: Oct. 28, 2003

(65) Prior Publication Data

US 2004/0243335 A1    Dec. 2, 2004

Related U.S. Application Data

(60) Provisional application No. 60/474,656, filed on May 30, 2003.

(51) Int. Cl.
*G06F 15/173* (2006.01)
(52) U.S. Cl. .................................. 709/224; 709/223
(58) Field of Classification Search ................. 709/223, 709/224; 370/252, 229, 390
See application file for complete search history.

(56) References Cited

U.S. PATENT DOCUMENTS

| 2002/0080726 | A1* | 6/2002 | Klassen et al. | 370/252 |
|---|---|---|---|---|
| 2003/0058792 | A1* | 3/2003 | Shao et al. | 370/229 |
| 2003/0147386 | A1* | 8/2003 | Zhang et al. | 370/390 |
| 2004/0090923 | A1* | 5/2004 | Kan et al. | 370/252 |
| 2004/0165538 | A1* | 8/2004 | Swami | 370/252 |

OTHER PUBLICATIONS

Alouf, S., Nain, P., Towsley, D.; "Inferring Network Characteristics via Moment-Based Estimators" Proceedings of IEEE Infocom, 2001, 10 pages.
Breslau, L., Knightly, E. W., Shenker, S., Stoica, I., Zhang, H.; "Endpoint Admission Control: Architectural Issues and Performance" Proceedings of ACM Sigcomm, 2000; 13 pgs.
Jain, M., Dovrolis, C.; "End-to-End Available Bandwidth: Measurement Methodology, Dynamics and Relation with TCP Throughput" Proceedings of ACM Sigcomm, Aug. 2002, 14 pgs.
Kelly, F. P., Key, P. B., Zachary, S.; "Distributed Admission Control" IEEE Journal on Selected Areas in Communications, vol. 18, n 12, 2000, 12 pgs.
Keshav, S.; "Packet-Pair Flow Control" Available at http://www.cs.cornell.edu/skeshav/doc/94/2-17.ps, 1994, 45 pgs.

(Continued)

*Primary Examiner*—Le Luu

(57) ABSTRACT

Various actively probing techniques on a network allow an estimation of the sustainable capacity available in the network. One implementation probes the network using two probe sequences having different loads. Probe estimates associated with each sequence are used to estimate the sustainable capacity in the network. Another implementation probes the network using two probe sequences, in which either the probe packet size or the inter-probe gap are different between the sequences. Calculation of a delay trend for each sequence leads to estimate of the maximum network capacity and the background load on the network. Yet another implementation uses a windowing technique to probe the sustainable capacity in the network. The window size is increased until the network is saturated. The number of bytes transferred within the window during a given time period is an estimate of the sustainable capacity of the network.

58 Claims, 10 Drawing Sheets

OTHER PUBLICATIONS

Lai, K., Baker, M.; "Nettimer: A Tool for Measuring Bottleneck Link Bandwidth" In Proceedings of the USENIX Symposium on Internet Technologies and Systems. USENIX, Mar. 2001. 13 pgs.

Matoba, K., Ata, S., Murata, M.; "Improving Accuracy of Bandwidth Estimation for Internet Links by Statistical Methods" IEICE Transactions on Communications, vol. E00-B, No. 6, Jun. 2001, 10 pgs.

Ribeiro, V., Coates, M., Riedi, R., Sarvotham, S., Hendricks, B., Baraniuk, R.; "Mulifractal Cross-Traffic Estimation" Proceedings ITC Specialist Seminar on IP Traffic Measurement, Modeling & Management, Sep. 2000, 10 pgs.

Jacobson, V.; "Pathchar" published on the internet at http://www.caida.org/tools/utilities/others/pathchar/, last updated May 1997, 1 page.

* cited by examiner

# ACTIVE PROBING FOR SUSTAINABLE CAPACITY ESTIMATION OF NETWORKED DATAFLOWS

RELATED APPLICATIONS

This applications claims priority to U.S. Provisional Application No. 60/474,656, entitled "Acappella—Admission Control and Active Probing for Networked Dataflows", filed on May 30, 2003 and specifically incorporated herein by referenced for all that it discloses and teaches.

TECHNICAL FIELD

The invention relates generally to networking environments, and more particularly to estimation of sustainable capacity in a network.

BACKGROUND

In a communication network, it can helpful to determine the network capacity that is available for a new channel. For example, in a small home network, a number of devices (e.g., servers, desktop computers, Personal Digital Assistants (PDAs)) may be connected using a variety of OSI Communications Model Layer 2 technologies. In addition, various combinations of switches, hubs, wireless access points, and wireless bridges, etc. may be employed in the network configuration.

Measuring network characteristics in such networks may be important for applications and services such as streaming multimedia data across the network. For example, with knowledge of the sustainable capacity between two nodes in the network, a user's multimedia application can determine whether and at what data rate to safely start a new multimedia stream.

However, existing approaches for determining available capacity generally require distributed intelligence in the network (e.g., detection of packet loss or management of Explicit Congestion Notification (ECN) marks). Furthermore, some such approaches are designed to operate only on wide area networks, failing to adequately support small network.

SUMMARY

Implementations described and claimed herein address the foregoing problems by actively probing the network to estimate the sustainable capacity available in the network between two devices. One implementation probes the network using two probe sequences having different loads. Average round-trip delay times associated with each sequence are used as probe estimates to estimate the sustainable capacity in the network. Another implementation probes the network using two probe sequences, in which either the probe packet size or the inter-probe gap are different between the sequences. Calculation of a delay trend for each sequence leads to an estimate of the maximum network capacity and the background load on the network, from which sustainable capacity may be determined. Yet another implementation uses a windowing technique to probe the sustainable capacity in the network. The window size is increased until the network is saturated. The number of bytes transferred in the resulting window during a given time period is an estimate of the sustainable capacity of the network.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program The computer program product encodes a computer program for executing on a computer system a computer process. A first probe estimate is computed from a first probe sequence transmitted over a network from a first device to a second device. A second probe estimate is computed from a second probe sequence transmitted over the network from the first device to the second device. The first probe sequence provides a different load to the network than the second probe sequence. A sustainable capacity of the network is estimated based on the first probe estimate and the second probe estimate.

In another implementation, a method is provided. A first probe estimate is computed from a first probe sequence transmitted over a network from a first device to a second device. A second probe estimate is computed from a second probe sequence transmitted over the network from the first device to the second device. The first probe sequence provides a different load to the network than the second probe sequence. A sustainable capacity of the network is estimated based on the first probe estimate and the second probe estimate.

In yet another implementation, a system is provided. A probe sequence generator generates a first probe sequence and a second probe sequence. A communication module transmits the first probe sequence and the second probe sequence to a target. The communication module also receives a first response sequence associated with the first probe sequence and a second response sequence associated with the second probe sequence. The communications module computes a first probe estimate from the first probe sequence and a second probe estimate from the second probe sequence. A probe performance analyzer estimates a sustainable capacity in the network characterizing sustainable capacity of the network for data traffic from the first device and the second device based on the first probe estimate and the second probe estimate.

Yet another computer program product implementation is provided. A first round-trip delay trend associated with a first probe sequence transmitted over a network from a first device to a second device is computed. A second round-trip delay trend associated with a second probe sequence transmitted over the network from the first device to the second device is computed. A maximum capacity and a background load of the network are estimated based on the first round-trip delay trend and the second round-trip delay trend. The sustainable capacity of the network is estimated based on the maximum capacity and the background load of the network.

Yet another method implementation is provided. A first round-trip delay trend associated with a first probe sequence transmitted over a network from a first device to a second device is computed. A second round-trip delay trend associated with a second probe sequence transmitted over the network from the first device to the second device is computed. A maximum capacity and a background load of the network are estimated based on the first round-trip delay trend and the second round-trip delay trend. The sustainable capacity of the network is estimated based on the maximum capacity and the background load of the network.

Yet another system implementation is provided. A probe sequence generator generates a first probe sequence and a second probe sequence. A communication module transmits the first probe sequence and the second probe sequence to a target. The communication module also receives a first response sequence associated with the first probe sequence and a second response sequence associated with the second probe sequence; and computes first round-trip delay times of the first probe sequence and second round-trip delay times of the second probe sequence. A probe performance analyzer computes a first round-trip delay trend associated with a first probe sequence and a second round-trip delay trend associated with a second probe sequence. The probe performance analyzer also estimates a maximum capacity and a background load of the network based on the first round-trip delay trend and the second round-trip delay trend, and estimates a sustainable capacity of the network based on the maximum capacity and the background load of the network.

Other implementations are also described and recited herein.

BRIEF DESCRIPTIONS OF THE DRAWINGS

DETAILED DESCRIPTION

Various actively probing techniques on a network allow an estimation of the sustainable capacity available in the network. One implementation probes the network using two probe sequences having different loads. Average round-trip delay times associated with each sequence are used as probe estimates to estimate the sustainable capacity in the network. Another implementation probes the network using two probe sequences, in which either the probe packet size or the interprobe gap are different between the sequences. Calculation of a delay trend for each sequence leads to estimate of the maximum network capacity and the background load on the network. Yet another implementation uses a windowing technique to probe the sustainable capacity in the network. The window size is increased until the network is saturated. The number of bytes transferred within the window during a given time period provides an estimate of the sustainable capacity of the network.

Figure 1:
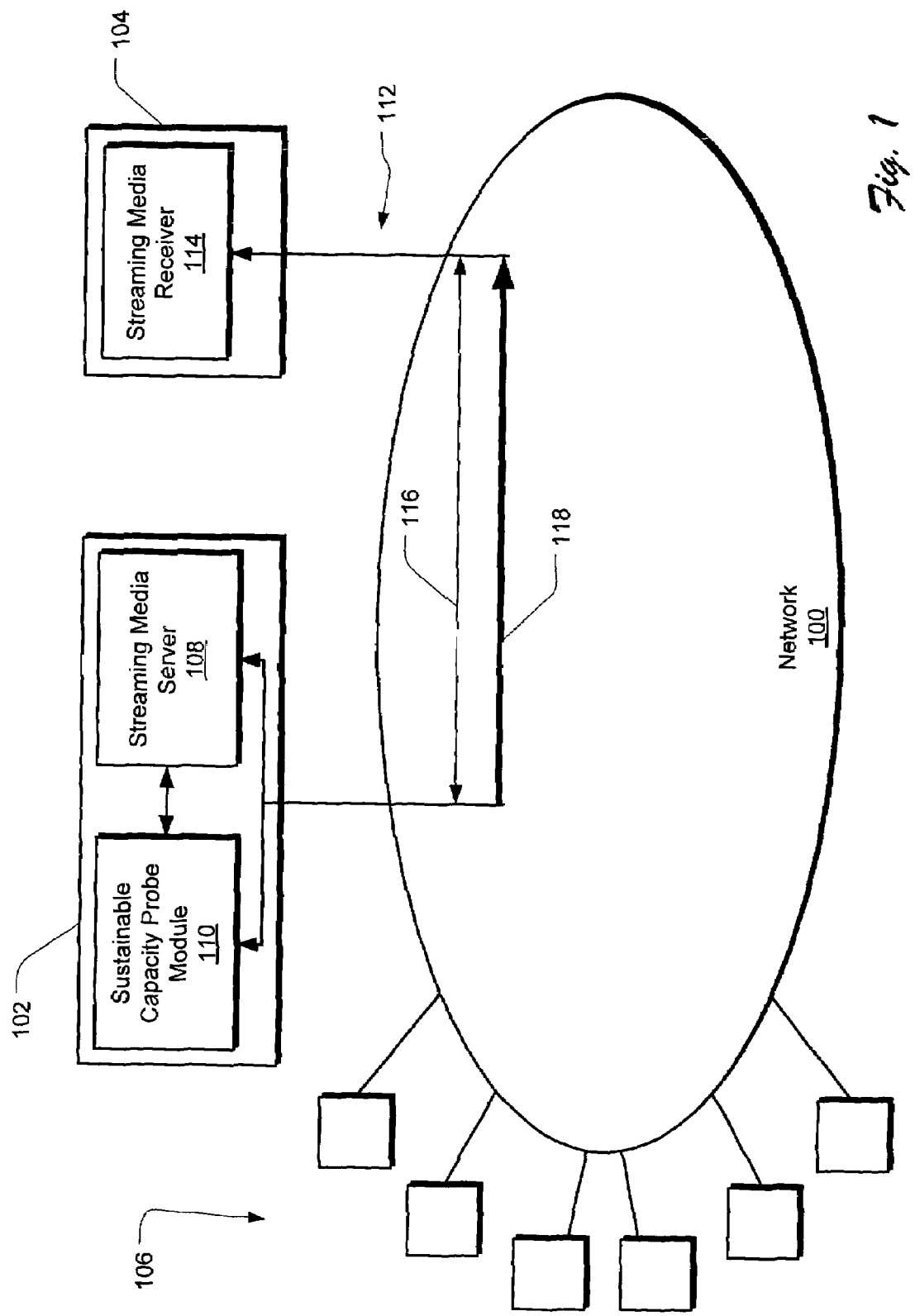
FIG. 1 illustrates an exemplary network including a first network device and a second network device in an asymmetric configuration.

FIG. 1 illustrates an exemplary network 100 including a first network device 102 and a second network device 104 in an asymmetric configuration. For example, the first network device 102 may be a media server system and the second network device 102 may be a client computer that has requested access to streamed media. Other network devices 106 may also be coupled to the network 100 and influence the sustainable capacity that is available for sending data between devices 102 and 104.

The first network device 102 includes a transmission module, such as a streaming media server 108, and a sustainable capacity probe 110. The streaming media server 108 transfers data from the first network device 102 to the second network device 104 through a logical network connection 112. In order to provide a high quality of service to the second network device 104, the first network device 102 attempts to estimate the sustainable capacity of the logical network connection 112, which may also be heavily influenced by communications of other network nodes, such as the devices 106.

The second network device 102 includes a reception module (or "IP target"), such as a streaming media receiver 114. For example, the streaming media server 108 may transmit streaming multimedia data over the logical connection 112 to the streaming media receiver, which presents the multimedia as content to a user (e.g., through a media player module).

The logical network connection 112 includes a control channel 116 and a data channel 118. The control channel and data channel may be unidirectional or bidirectional. The control channel 116 communicates control signals used to determine spare capacity between devices 102 and 104 (typically, bidirectional), such as by communicating probe packets and acknowledgements. The probes and acknowledgements may be communicated in-band or out-of-band with respect to the data channel 118. The data channel 118 communicates the primary transmission traffic, such as the streaming media. The transmission rate of this multimedia data is dependent upon the sustainable capacity of the network 100 and the rate needed to serve the reception module with an acceptable quality of service (e.g., the acceptable streaming rate). The control channel may be separate from or integral with the application's data channel or the application's own control channel.

To estimate the sustainable capacity in the network 100, the sustainable capacity probe module 110 transmits probes to the second device 104. A probe elicits a response from the second device 102. For example, a probe may take the form of an ICMP ping packet, although other probe formats may be employed. In another implementation, a probe may be included in an arbitrary IP packet. A probe also includes a unique signature to identify the probe and the corresponding response so that the sustainable capacity probe module 110 can associate the probe and the response into a probe-response pair.

A probe and a response are also time-stamped. For example, the probe may be time-stamped just prior to transmission and the response may be time-stamped just after receipt to minimize unnecessary delay overhead between the two communications. The sustainable capacity probe module 110 determines the difference in the probe time stamp and the response time stamp of a probe-response pair. In one or more embodiments, this difference value D may be used to compute the estimated sustainable capacity of the network.

Figure 2:
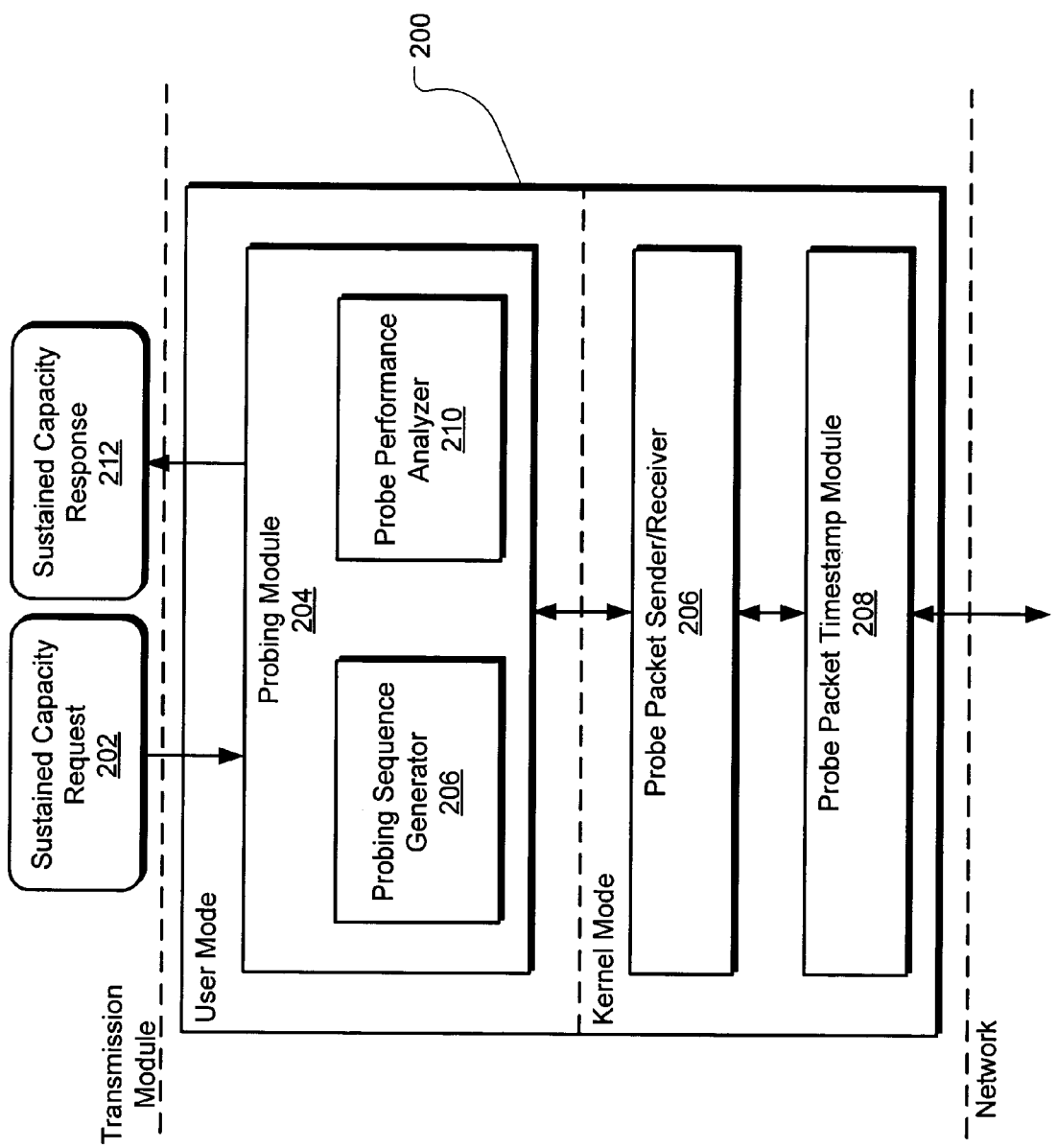
FIG. 2 illustrates an exemplary sustainable capacity probe.

FIG. 2 illustrates an exemplary sustainable capacity probe module 200. By way of a sustained capacity request 202, a transmission module inquires about available sustained capacity in order to determine an appropriate transmission rate from a first device to a second device. In one implementation, the sustained capacity request 202 takes the form of a request for a specific level of sustained capacity (e.g., "I want a usable capacity of X Bps for transmission to a device B", where device B is an IP target). However, other request formats are contemplated, including without limitation a request regarding multiple acceptable usable capacities or IP targets or a request for a best possible usable capacity or IP target. Therefore, in various implementations, usable capacity requests may or may not specify bounds on the requested capacities. The responses to such requests can describe the feasibility of the capacity requests and may include an alternative set of possible capacity bounds.

A probing module 204 operates in user mode on a first network device and includes a probing sequence generator 206, which generates an appropriate probe sequence that is transmitted to the IP target. However, it should be understood that the probing module 204 could also operating in kernel mode or could even be combined with application data. Various exemplary probe sequences are discussed elsewhere in this document. Responsive to the sustained capacity request 202, the probing module 204 identifies the IP target. Depending on the probe sequence employed, the probing module 204 generates probes of a given packet size and collects the probes into a sequence (or probe train) with a given inter-probe gap T and a given number of probes N. In addition, in certain implementations, an additional load may also be introduced into the probe sequence.

A probe sequence is passed to a probe packet sender/receiver 206, which (in the illustrated embodiment) executes in kernel mode; however, in alternative implementations, the probe packet sender/receiver 206 may execute in a user mode. The probe packet sender/receiver 206 adds a unique signature to outgoing probe packets of a probe sequence. The probe packet sender/receiver 206 may also be associated with the device's network stack, although this does not preclude implementations of the probe packet sender/receiver 206 both within and outside of the network stack. For example, in one implementation, the probing subsystem is an operating system service that all applications can use. A probe packet timestamp module 208 inserts a time stamp into each probe packet as it is transmitted onto the network toward the IP target. The probe packet timestamp module 208 may also be implemented in either a kernel mode or a user mode.

When each response packet (e.g., a ping acknowledgement) is received by the probe packet timestamp module 208, the module timestamps the response packet and checks the response packet to verify that the response corresponds to a previously transmitted probe. The response packet is then passed to the probe packet sender/receiver 206, which checks the unique signature of the response packet and groups matching probe-response pairs.

Given a matching probe-response pair, the round-trip delay associated with the pair is calculated and used by a probe performance analyzer 210 in the probing module 204 to estimate the available sustained capacity for communications over as the network to the IP target. In one implementation, a sustained capacity response 212 generated by the probe performance analyzer 210 specifies whether a requested level of sustained capacity is available (e.g., YES/NO). Alternatively or in addition, a sustained capacity response 212 may specify the estimated level of sustained capacity available over the network to the IP target, or some other combination of information responsive to the sustained capacity request 202.

Figure 3:
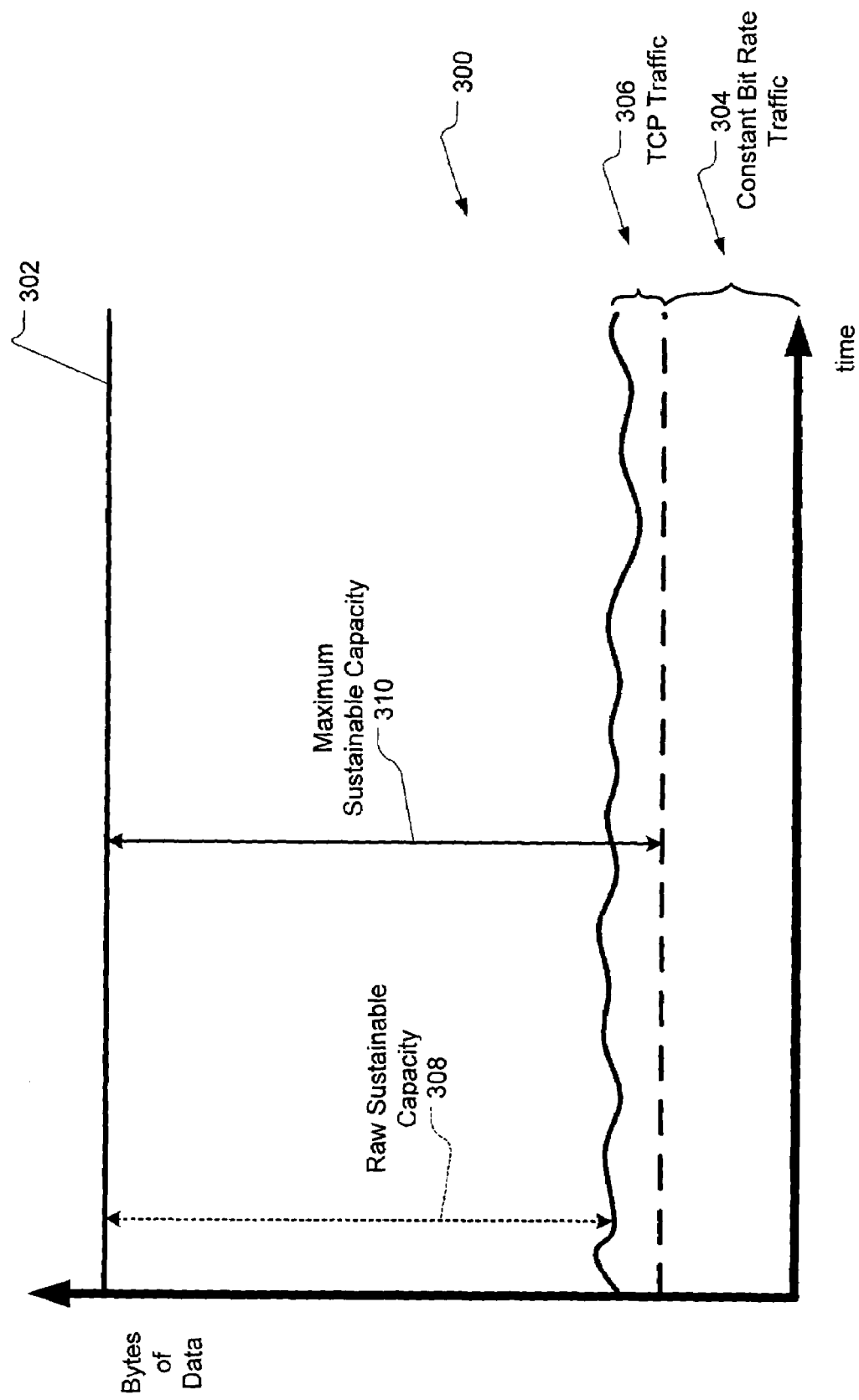
FIG. 3 illustrates a diagram depicting various elements of network capacity.

FIG. 3 illustrates a diagram 300 depicting various elements of network capacity. A capacity line 302 represents the available capacity of the channel absent any traffic (i.e., the maximum network capacity). Of this maximum network capacity, a portion of the traffic may be unreactive traffic (e.g., constant bit rate (CBR) traffic), which is commonly communicated using Uniform Datagram Protocol (UDP) packets, such as traffic associated with streaming media traffic. In FIG. 3, this traffic is represented by region 304. In contrast, another portion of the traffic may be reactive traffic, such as Transmission Control Protocol (TCP) packets, as represented by region 306. The raw sustainable capacity 308 is therefore represented by the maximum network capacity minus the capacity occupied by the CBR and TCP traffic in the channel. In some cases, this raw sustainable capacity is an acceptable value of the sustainable capacity in the network.

However, reactive traffic (e.g., TCP traffic) may react to a loss of available channel capacity by delaying or aborting transmissions. In the extreme, this reaction may result in the removal of all reactive traffic from the channel. As such, the maximum sustainable capacity 310 for streaming media traffic may be represented by the maximum network capacity minus the CBR traffic. Applying a load that saturates the network channel for a sustained period of time tends to provide a more accurate estimate of the maximum sustainable capacity because the reactive traffic is pushed out by the sustained, saturating load.

In one implementation, the sustainable capacity estimation involves two probe sequences or probe trains. The network load introduced by each probe sequence is different. For example, in FIG. 4, a low load probe sequence is shown, without additional load packets; whereas in FIG. 5, a high load probe sequence is shown, with additional load packets spaced between the probes.

Figure 4:
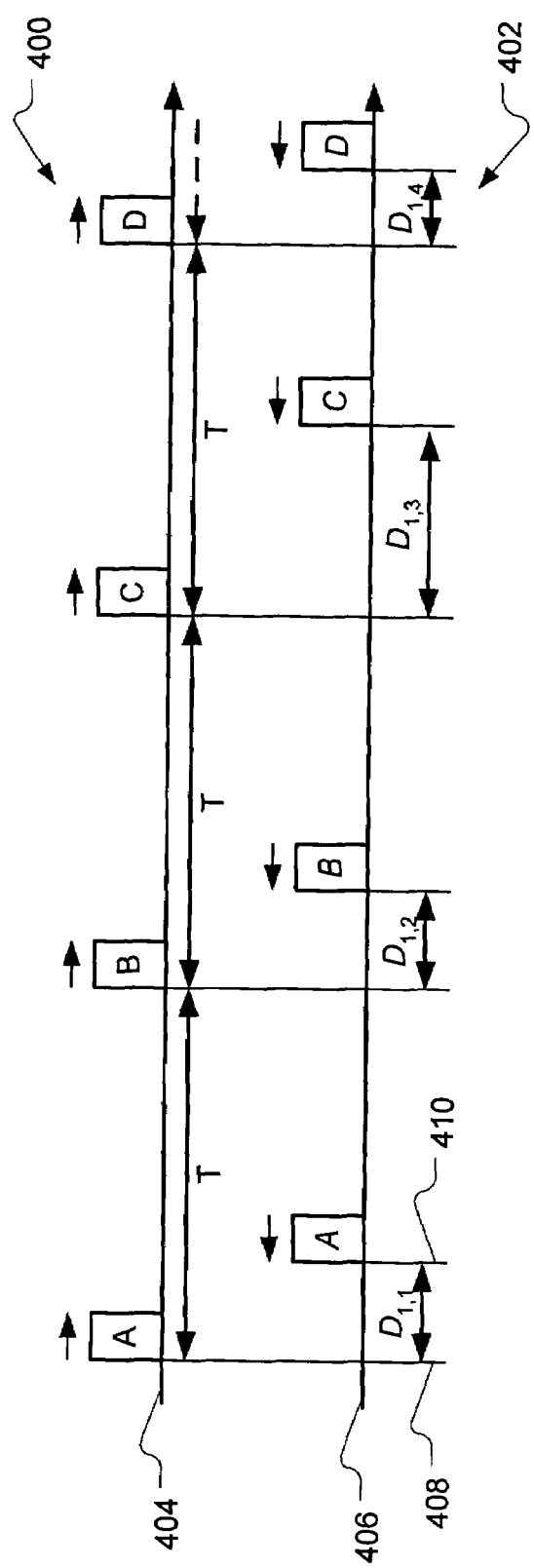
FIG. 4 illustrates an exemplary first probe sequence.

FIG. 4 illustrates an exemplary first probe sequence 400 and a response sequence 402. The sequences are laid out on time axes 404 and 406. Each probe packet is sent periodically at time period T. The probe packets are designated in FIG. 4 with an arrow pointing to the right and a capital letter. The capital letter represents a unique signature inserted into the probe packet by the probe packet sender/receiver. Each response packet is received after a round-trip to the IP target, such as an ICMP ping ACK packet. The response packets are designated in FIG. 4 with an arrow pointing to the left and a capital letter in italics. The capital letter in the response packets associated the response with a specific probe packet.

Each probe packet is time-stamped before transmission, and each response packet is time-stamped after reception. The difference in the reception timestamp (e.g., as shown by vertical line 408) and the corresponding transmission timestamp (e.g., as shown by vertical line 410) represents a round-trip delay time $D_{1,x}$, where the subscript "1" represents a delay associated with a first probe sequence and the subscript "x" represents the sequence number (e.g., 1, 2, 3, ... ) of the probe-response pair. The average of the delays in the first probe sequence is indicated as $\bar{D}_1$.

Figure 5:
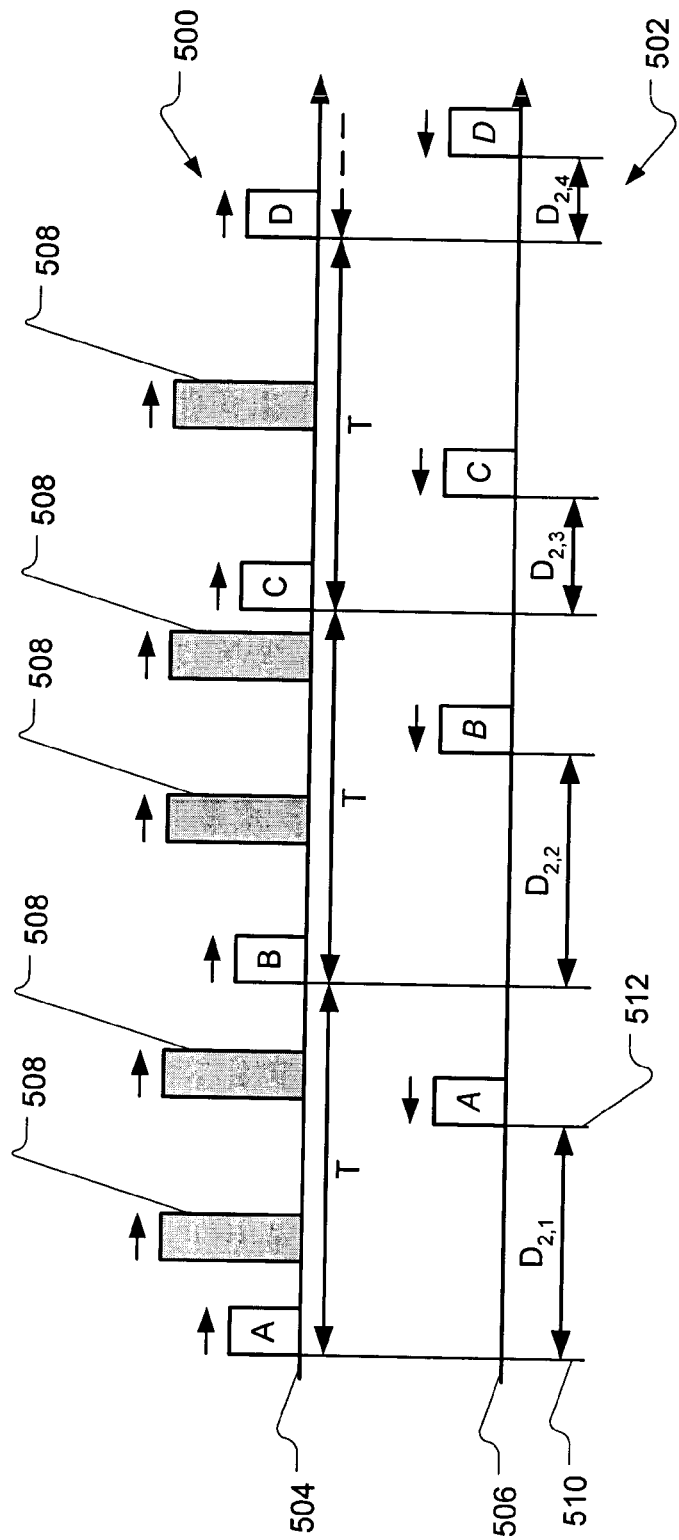
FIG. 5 illustrates an exemplary second probe sequence.

FIG. 5 illustrates an exemplary second probe sequence 500 and a response sequence 502. The sequences are laid out on time axes 504 and 506. Each probe packet is sent periodically at time period T. In some implementations, T may remain unchanged over long periods of communications. In alternative implementations, T may be varied from one probe sequence to another in order to negate correlation effects between probe traffic and background traffic.

The probe packets are designated in FIG. 5 with an arrow pointing to the right and a capital letter. The capital letter represents a unique signature inserted into the probe packet by the probe packet sender/receiver. Each response packet is received after a round-trip to the IP target. The response packets are designated in FIG. 5 with an arrow pointing to the left and a capital letter in italics. The italicized capital letter in the illustrated response packets associates a response with a specific probe packet.

In contrast to FIG. 4, the second probe sequence 500 includes load packets 508. Although both the first and second probe sequences can include load packets, the load introduced to the network channel should be different between the two probe sequences. In one such implementation, any loads applied to not saturate the network channel and, therefore, does not drive the network to a halt.

Each probe packet is time-stamped before transmission, and each response packet is time-stamped after reception. The difference in the reception timestamp (e.g., as shown by vertical line 510) and the corresponding transmission timestamp (e.g., as shown by vertical line 512) represents a round-trip delay time $D_{2,x}$, where the subscript "2" represents a delay associated with a second probe sequence and the subscript "x" represents the sequence number (e.g., 1, 2, 3, . . . ) of the probe-response pair. The average of the delays in the second probe sequence is indicated as $\hat{D}_2$.

Figure 6:
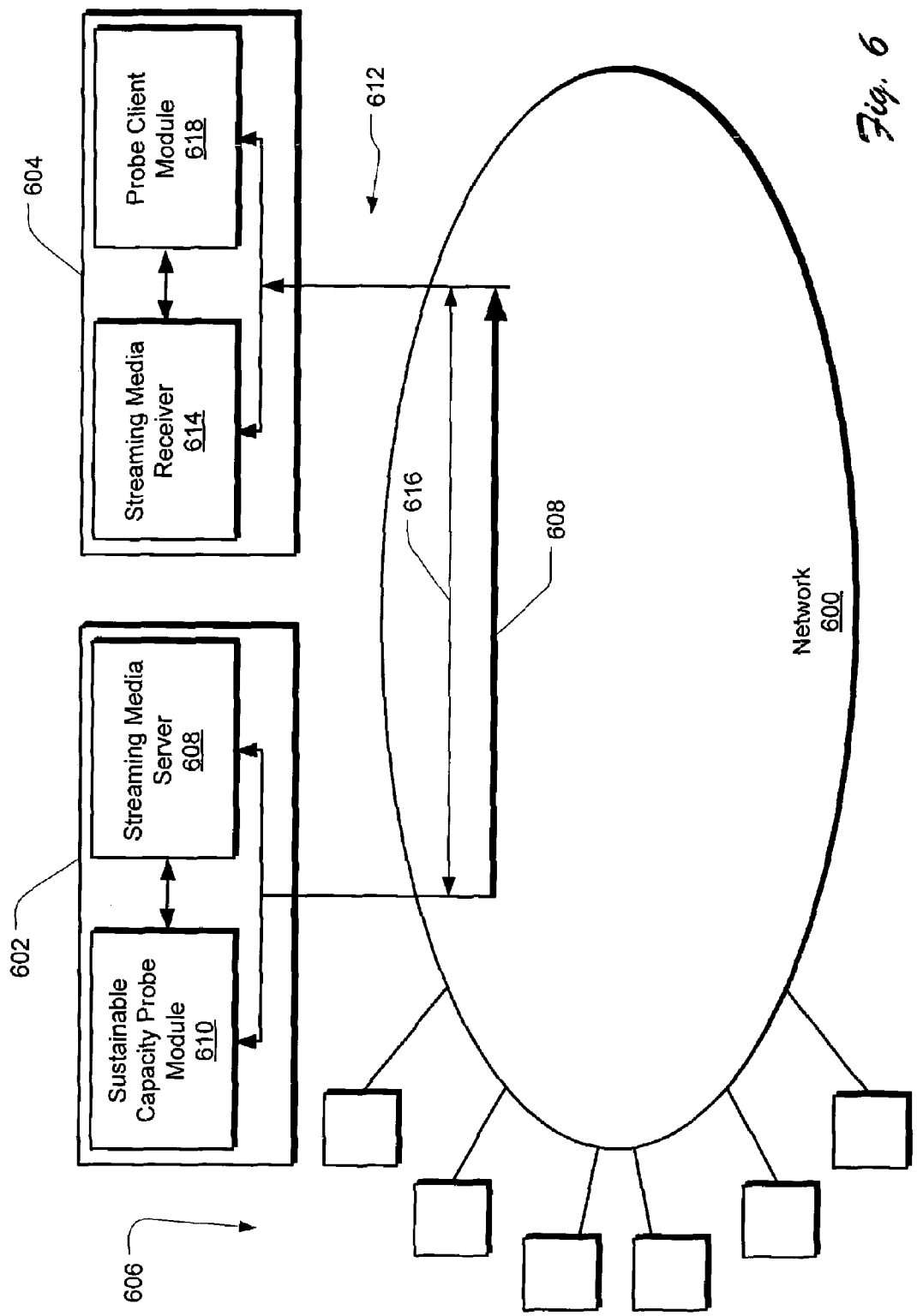
FIG. 6 illustrates an exemplary network including a first network device and a second network device in a symmetric configuration.

FIG. 6 illustrates an exemplary network including a first network device 600 and a second network device 602 in a symmetric configuration. Other network devices 606 may also be coupled to the network 100 and influence the sustainable capacity that is available for sending data between devices 602 and 604.

The first network device 602 includes a transmission module, such as a streaming media server 608, and a sustainable capacity probe 610. The streaming media server 608 transfers data from the first network device 602 to the second network device 604 through a logical network connection 612. In order to provide a high quality of service to the second network device 604, the first network device 602 attempts to estimate the sustainable capacity of the logical network connection 612, which may also be heavily influenced by communications of other network nodes, such as the devices 606. The second network device 602 includes a reception module (or "IP target"), such as a streaming media receiver 614. For example, the streaming media server 608 may transmit streaming multimedia data over the logical connection 612 to the streaming media receiver, which presents the multimedia content to a user (e.g., through a media player module).

The logical network connection 612 includes a control channel 616 and a data channel 618. The data channel 618 may be bidirectional or there may be separate server-client and client-server data and control channels. The control channel 616 communicates control signals for probes and acknowledgements, which may be communicated in-band or out-of-band with respect to the data channel. The data channel 618 communicates the primary transmission traffic, such as the streaming media. The transmission rate of this multimedia data is dependent upon the sustainable capacity of the network 600 and the rate needed to serve the reception module with an acceptable quality of service (e.g., the acceptable streaming rate).

To estimate the sustainable capacity in the network 600 from the first network device 602 to the second network device 604, the sustainable capacity probe module 610 transmits probes to the second device 604. A probe elicits a response from the second device 602. For example, a probe may take the form of an ICMP ping packet, although other probe formats may be employed, generally taking the form of IP packets. A probe also includes a unique signature to identify the probe and the corresponding response so that the sustainable capacity probe module 610 can associate the probe and the response of a probe-response pair.

A probe and a response are also time-stamped. For example, the probe may be time-stamped just prior to transmission and the response is time-stamped just after receipt to minimize unnecessary delay overhead between the two communications. The sustainable capacity probe module 610 determines the difference in the probe time stamp and the response time stamp of a probe-response pair. This difference value D is used to compute the estimated sustainable capacity of the network from the first network device 602 to the second network device 604.

However, in contrast to the configuration shown in FIG. 1, the symmetric configuration includes a probe client module 618 in the second network device 604 that can perform similar probe sequence generation and analysis as provided by the sustainable capacity probe module 610. The probe client module 618 sends out probes from the second network device 604 to the first network device 602, receives the corresponding responses and estimates the sustainable capacity of the network from the second network device 604 to the first network device 602, for circumstances when the sustainable capacities available in the two directions differ.

Figure 7:
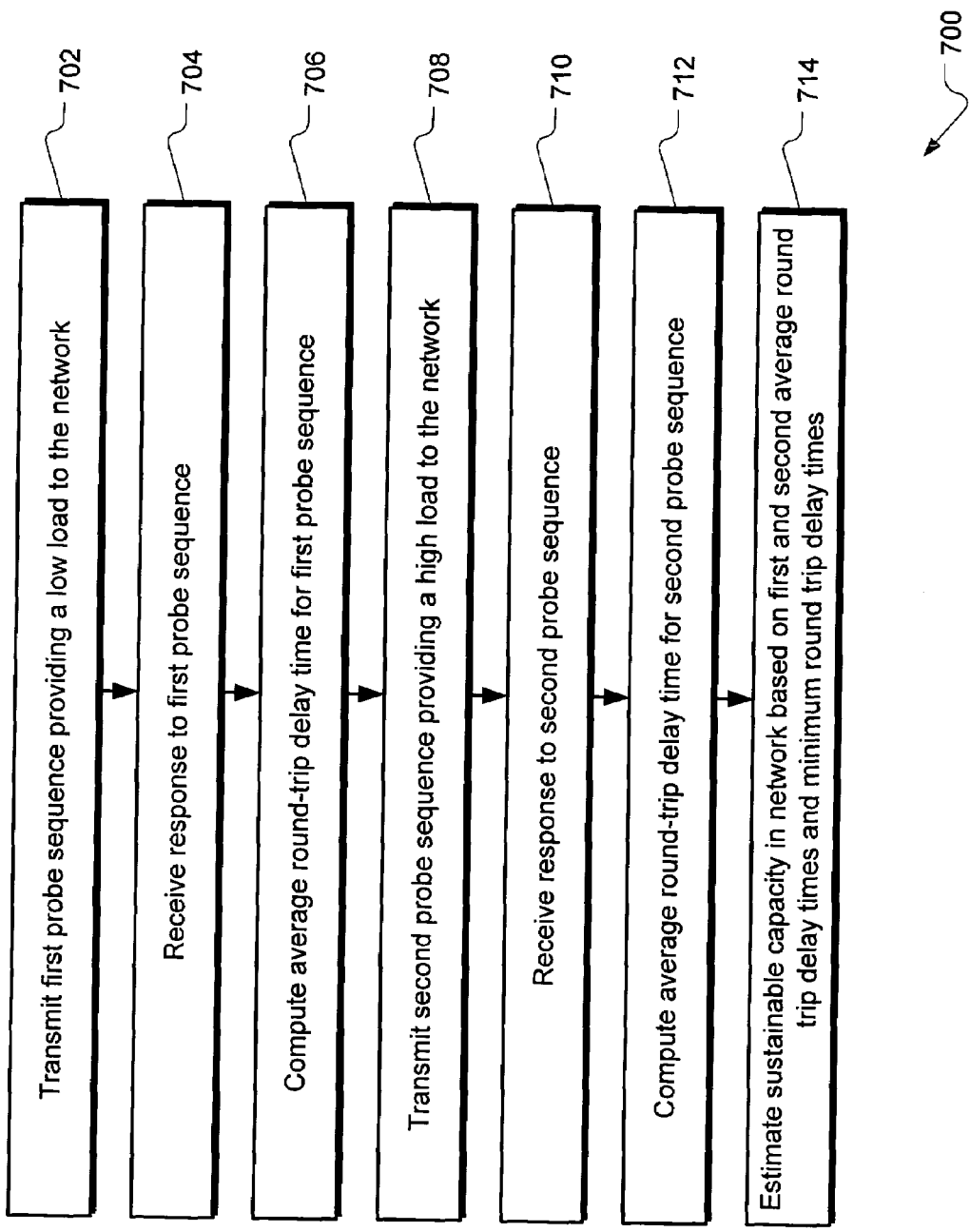
FIG. 7 illustrates exemplary operations for estimating sustained capacity in a network.

FIG. 7 illustrates exemplary operations 700 for estimating sustained capacity in a network. A transmission operation 702 transmits a first probe sequence (e.g., containing ICMP ping packets) from a first network device to an IP target. Each probe has a unique signature, such as a sequence number, that distinguishes each probe packet from others in the sequence. The first probe sequence provides a low load to the network (e.g., a negligible load to some load less than the load provided by the second probe sequence). A reception operation 704 receives the corresponding responses (e.g., ICMP ping ACK packets) to the first probe sequence from the IP target. By collecting corresponding probe-response pairs (e.g., based on the unique signatures), a computation operation 706 determines the round-trip delay times for each pair in the first probe sequence and then determines the average round-trip delay time $\hat{D}_1$ in the first probe sequence. The average round-trip delay time is one example of a probe estimate. Other examples of a probe estimate may include without limitation the median round-trip delay time, standard deviations in round-trip delay times, round-trip delay time ranges, or other robust estimates.

A second transmission operation 708 transmits a second probe sequence from the first network device to the IP target. The second probe sequence provides a different load to the network (e.g., a load higher than that provided by the first probe sequence). It should be understood, however, that the relative order of the lower and higher loads may be changed. A reception operation 710 receives the corresponding responses to the second probe sequence from the IP target. By collecting corresponding probe-response pairs, a computation operation 712 determines the round-trip delay times for each pair in the second probe sequence and then determines the average round-trip delay time $\hat{D}_2$ in the second probe sequence.

An estimation operation 714 estimates the sustainable capacity available in the network from the first network device to the IP target based on the average round-trip delay times $\hat{D}_1$ and $\hat{D}_2$, the difference in the loads $\delta m$, and a minimum round-trip delay time $D_{min}$ associated with all of the probe-response pairs. In one implementation, the estimate is computed as follows:

$$SusCap_{est} = \delta m \frac{\hat{D}_2 - D_{min}}{\hat{D}_2 - \hat{D}_1} \qquad (1)$$

wherein $SusCap_{est}$ represents the sustainable capacity that is available in the network channel from the first network device to the IP target. It should be understood that the same algorithm may also be employed in a symmetric configuration to determine the sustainable capacity that is available in the network from the IP target to the first network device. In another implementation, other statistics of the delay may be used instead of the average delays times. For example, $\hat{D}_1$ and $\hat{D}_2$ could include other probe estimates, such as the medians of the delays or trimmed means, among other metrics.

In yet another implementation, $\hat{D}_1$ and $\hat{D}_2$ may estimate the scale of the distributions. For example, $\hat{D}_1$ may be the standard deviation of the delays (or a robust alternative), with $\hat{D}_2$ being similarly defined, in which case, the estimate is computed as:

$$SusCap_{est} = \delta m \frac{\hat{D}_2}{\hat{D}_2 - \hat{D}_1} \quad (2)$$

Figure 8:
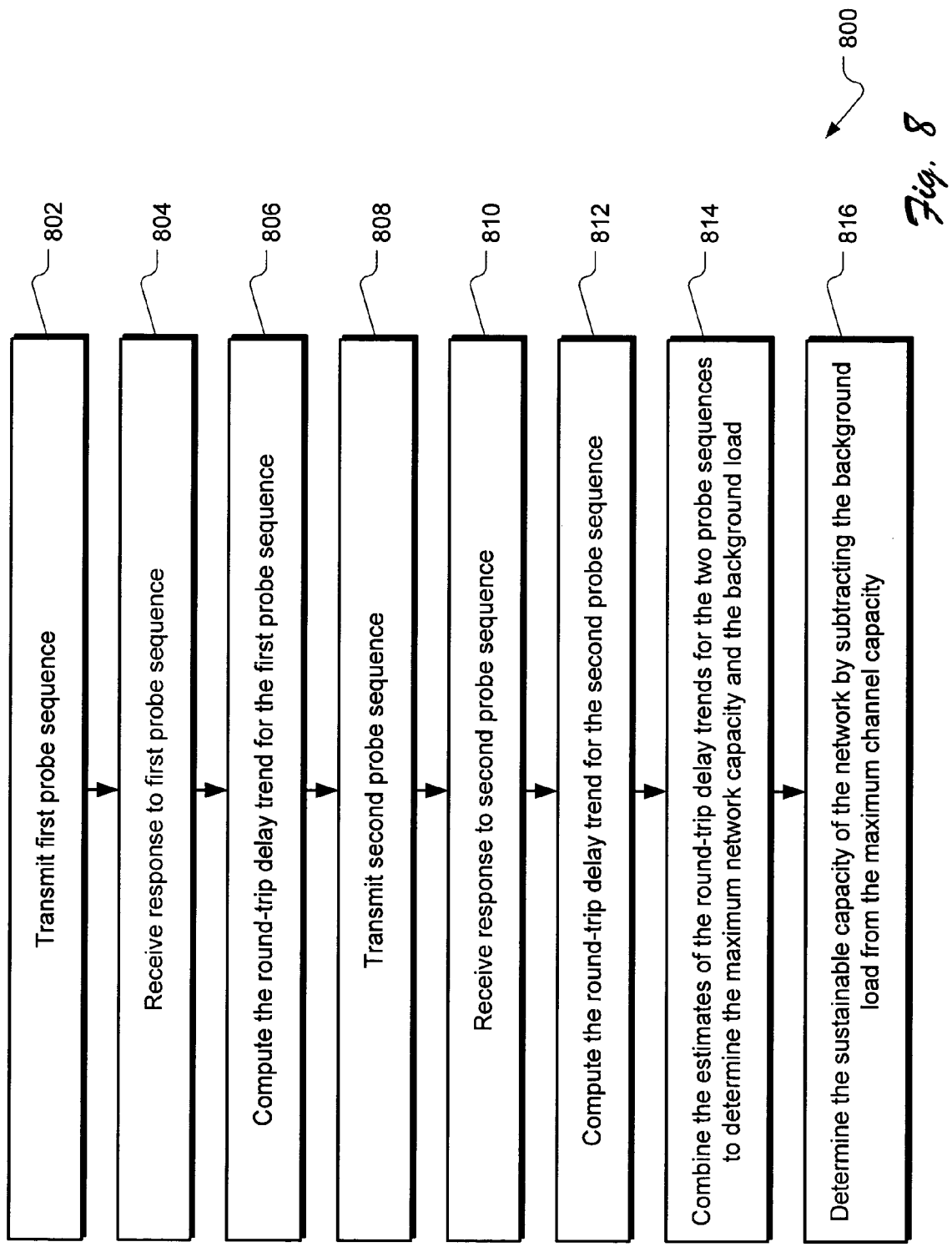
FIG. 8 illustrates alternative exemplary operations for estimating sustained capacity in a network.

FIG. 8 illustrates alternative exemplary operations 800 for estimating sustained capacity in a network. Two heavily loaded probe sequences (i.e., at or near saturation of the network channel) are transmitted. However, either the probe packet sizes or the inter-probe gaps of the two sequences are different.

A delay trend of a given probe sequence may be estimated using the following algorithm:

$$DelayTrend_i = \frac{1}{N-1} \sum_{n=2} (D_{i,n} - D_{i,n-1}) \approx \frac{1}{C}(p_i + B(\delta t_i)) - \delta t_i \quad (3)$$

wherein i represents the probe index (i.e., 1 or 2), N represents the number of probes packets in a sequence, $D_{i,n}$ represents the round-trip delay of a probe-response pair in the i-th sequence, $D_{i,n-1}$ represents the round-trip delay of the previous probe-response pair in the sequence, C represents the maximum network capacity, $p_i$ represents the probe packet size of the i-th sequence, B represents the existing channel traffic (i.e., the background load), and $\delta t_i$ represents the inter-probe gap of the i-th sequence. Therefore, the estimate of available sustainable capacity is given by C−B.

To determine the values of C and B, the delay trends of both sequences may be combined:

$$DelayTrend_2 - DelayTrend_1 \approx \left[\left[\frac{1}{C}(p_2 + B(\delta t_2)) - \delta t_2\right] - \left[\frac{1}{C}(p_1 + B(\delta t_1)) - \delta t_1\right]\right] \quad (4)$$

If $\delta t_1 = \delta t_2$ and $p_1 \neq p_2$, and all are known values, then Equation (4) reduces to:

$$C = \frac{p_2 - p_1}{DelayTrend_2 - DelayTrend_1} \quad (5)$$

Thereafter, C can be inserted back into one of the Delay-Trend$_i$ equations $$\left(e.g., \frac{1}{C}(p_i + B(\delta t_i)) - \delta t_i\right)$$

to solve for B.

Alternatively, if $\delta t_1 \neq \delta t_2$ and $p_1 \neq p_2$, and all are known values, then the Equations (3) and (4) for i=1 and 2 can be solved to give C if some specified form of $B(\delta t)$ is assumed.

Accordingly, the implementation may be represented by the operations 800. A transmission operation 802 transmits a first probe sequence from a first network device to an IP target. The first probe sequence is characterized by a probe packet size $p_i$ and an inter-probe gap $\delta t_1$. Each probe has a unique signature, such as a sequence number, that distinguishes each probe packet from others in the sequence. A reception operation 804 receives the corresponding responses to the first probe sequence from the IP target. By collecting corresponding probe-response pairs (e.g., based on the unique signatures), a computation operation 806 determines the round-trip delay trend DelayTrend$_i$ for first probe sequence.

A second transmission operation 808 transmits a second probe sequence from the first network device to the IP target. A reception operation 810 receives the corresponding responses to the second probe sequence from the IP target. By collecting corresponding probe-response pairs, a computation operation 812 determines the round-trip delay trend DelayTrend$_2$ for the second probe sequence. A combination operation 814 combines the estimates of the delay trend to determine the maximum network capacity C and the background load B. A determining operation 816 subtracts the background load B from the maximum network capacity C to determine the sustainable capacity in the network.

It should be understood that the same algorithm may also be employed in a symmetric configuration to determine the sustainable capacity that is available in the network from the IP target to the first network device.

Yet another implementation employs a windowing technique to determine a saturation load on the network. A "window" represents a number of packets or a number of bytes sent out from the server at any one time.

Figure 9:
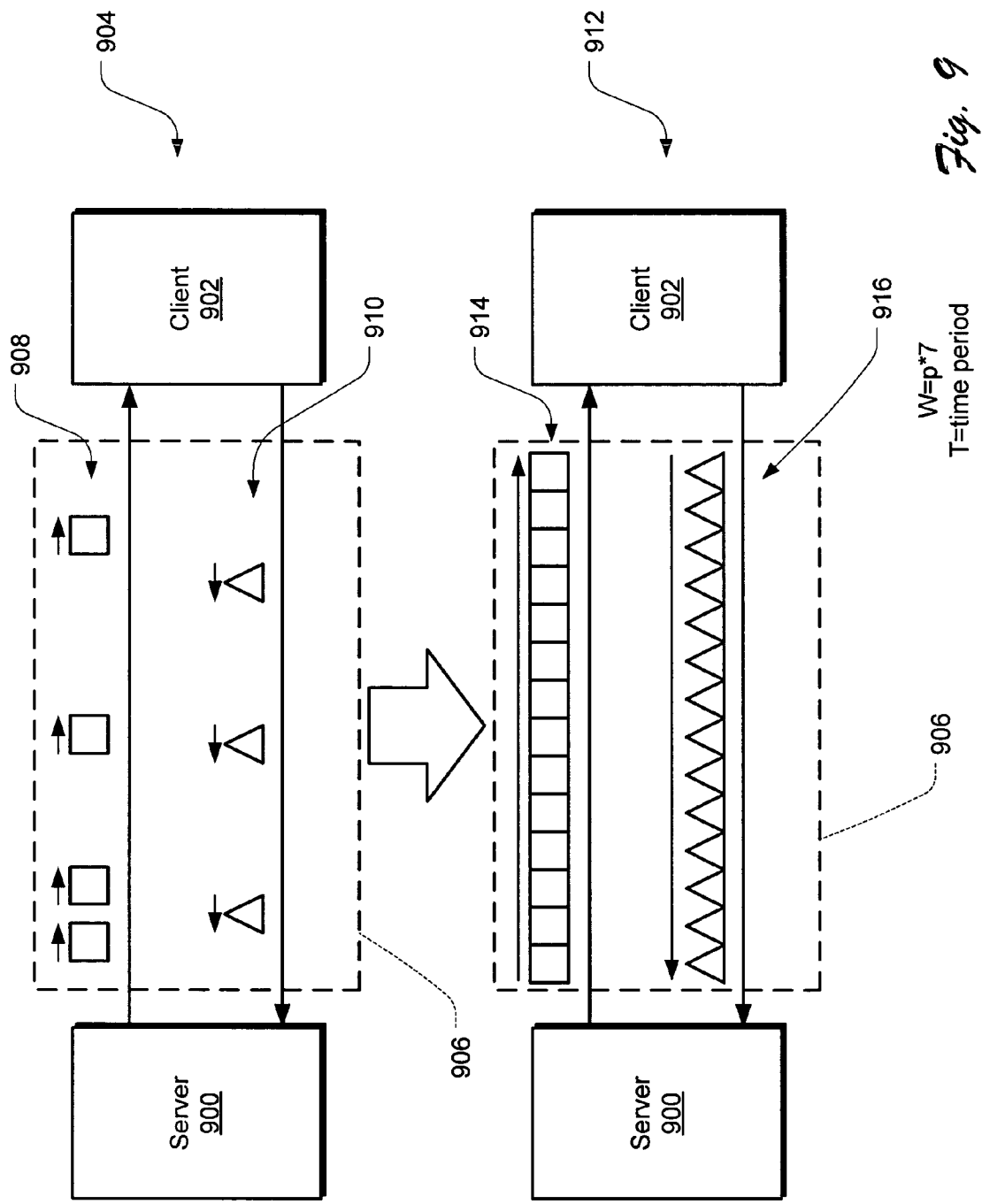
FIG. 9 illustrates exemplary windows for estimating sustained capacity in a network.

FIG. 9 illustrates an exemplary windowing technique for determining the sustained capacity available in a network. A server 900 and a client 902 are coupled by a network. Given a time period T, a slow start phase algorithm incrementally increases the size of a window until packets are lost. For example, at an early stage 904 of the slow start phase, a window 906 of seven packets (4 probe packets 908 and 3 response packets 910) is tested. At this stage, the window 906 does not saturate the network. Therefore, the window 906 is increased in size.

In a later stage 912 of the slow start phase, the window 906 is tested at 28 packets. At this window size, the network is full. After this window size, any further increase in size would result in lost packets. Therefore, the slow start phase stops at a maximum window size $W_{max}$ equals 28.

In one implementation, the time period T is chosen to be the minimum round trip delay time ($RTT_{min}$) detected by calibration (e.g., transmitting a 11 sequence of probes and taking the shortest round-trip delay time). A rough estimate of the sustainable capacity may be computed using $W_{max}/RTT_{min}$, if the window is in bytes $$\left(or \frac{w_{max}(\text{packet size})}{RTT_{min}}, \text{ if the window size is in packets}\right). \quad (6)$$

In another implementation, a sustained transfer phase is used to flood the network with the $W_{max}$ number of packets for a predetermined time period T. Then, the number of bytes per unit time $$\left(\text{e.g., } \frac{w_{max}(\text{packet size})}{T}\right)$$

transmitted in the window $W_{max}$ during the predetermined time period T represents the sustainable capacity of the network.

Figure 10:
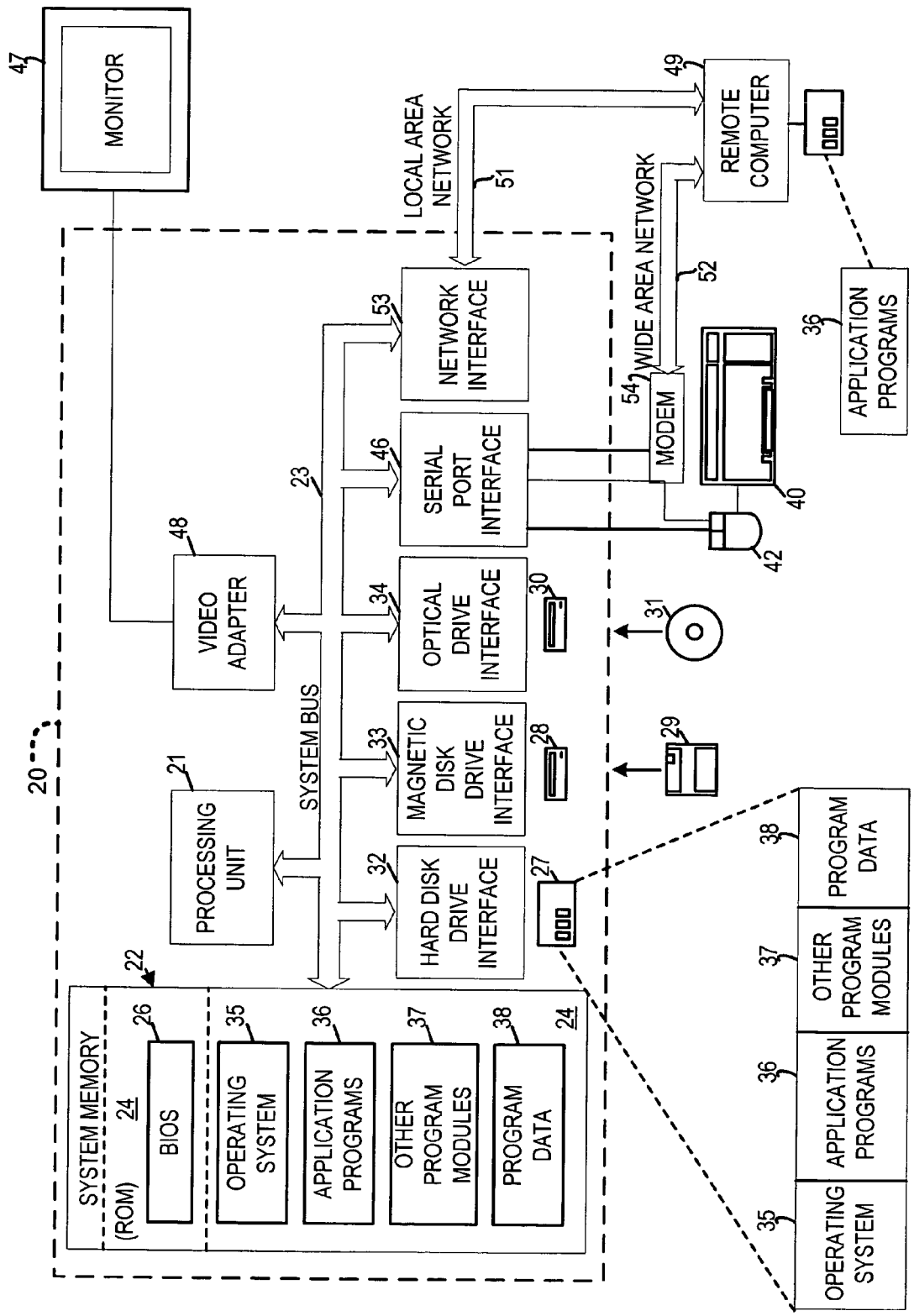
FIG. 10 illustrates a system useful for implementing an embodiment of the present invention.

The exemplary hardware and operating environment of FIG. 10 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, probing modules, probe sequence generators, probe performance analyzers, probe packet senders/receivers, and other modules may be incorporated as part of the operating system 35, application programs 36, or other program modules 37. Signatures, delay times, window sizes, probe packets, response packets, and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
computing a first probe estimate from a first probe sequence transmitted over a network from a first device to a second device;
computing a second probe estimate from a second probe sequence transmitted over the network from the first device to the second device, the first probe sequence providing a different load to the network than the second probe sequence;

estimating a sustainable capacity of the network based on the first probe estimate and the second probe estimate; and wherein the estimating operation comprises computing an algorithm substantially of the form:

$$SusCap_{est} = \delta m \frac{\hat{D}_2 - D_{min}}{\hat{D}_2 - \hat{D}_1}$$

wherein $SusCap_{est}$ represents the sustainable capacity value, $\delta m$ represents a load difference between the second probe sequence and the first probe sequence $\hat{D}_2$ represents the second robe estimate, $\hat{D}_1$ represents the first probe estimate, and $D_{min}$ represents a minimum delay time of individual round-trip delay times associated with the first load probe and the second load probe sequence.

2. The method of claim 1 wherein the sustainable capacity is further based on a minimum delay time of individual roundtrip delay times associated with the first probe sequence and the second probe sequence.

3. The method of claim 1 wherein the sustainable capacity of the network relates to data traffic flowing from the first device to the second device, and further comprising:

computing a third probe estimate from a third probe sequence transmitted over the network from the second device to the first device;

computing a fourth probe estimate from a fourth probe sequence transmitted over the network from the second device to the first device, the third probe sequence providing a different load to the network than the fourth probe sequence; and estimating a reverse sustainable capacity of the network for data traffic from the second device and the first device based on the third probe estimate and the fourth probe estimate.

4. The method of claim 1 wherein the first probe sequence includes probe packets periodically transmitted from the first device to the second device.

5. The method of claim 1 wherein neither the first probe sequence nor the second probe sequence saturate the network.

6. The method of claim 1 wherein the second probe sequence loads the network more than the first probe sequence.

7. The method of claim 1 further comprising:
generating a first probe sequence, wherein each probe packet in the first probe sequence has a unique signature.

8. The method of claim 1 further comprising:
timestamping each packet in the first probe sequence prior to transmission to the second network device.

9. The method of claim 1 further comprising:
timestamping each response to each probe packet in the first probe sequence after to reception of the probe packet from the second network device.

10. The method of claim 1 wherein each probe estimate is an average roundtrip delay time.

11. The method of claim 1 wherein each probe estimate is a median roundtrip delay time.

12. The method of claim 1 wherein each probe estimate is a range of roundtrip delay times.

13. The method of claim 1 wherein each probe estimate is a standard deviation of roundtrip delay times.

14. A computer program product disposed on a computer readable storage media encoding a computer program for executing on a computer system a computer process, the computer process comprising:

computing a first probe estimate from a first probe sequence transmitted over a network from a first device to a second device;

computing a second probe estimate from a second probe sequence transmitted over the network from the first device to the second device, the first probe sequence providing a different load to the network than the second probe sequence;

estimating a sustainable capacity of the network based on the first probe estimate and the second probe estimate; and wherein the estimating operation comprises computing an algorithm substantially of the form:

$$SusCap_{est} = \delta m \frac{\hat{D}_2 - D_{min}}{\hat{D}_2 - \hat{D}_1}$$

wherein $SusCap_{est}$ represents the sustainable capacity value, $\delta m$ represents a load difference between the second probe sequence and the first probe sequence, $\hat{D}_2$ represents the second probe estimate, $\hat{D}_1$ represents the first probe estimate, and $D_{min}$ represents a minimum delay time of individual round-trip delay times associated with the first load probe sequence and the second load probe sequence.

15. The computer program product of claim 14 wherein the sustainable capacity value is further based on a minimum delay time of individual roundtrip delay times associated with the first probe sequence and the second probe sequence.

16. The computer program product of claim 14 wherein the sustainable capacity of the network relates to data traffic flowing from the first device to the second device, and further comprising:

computing a third probe estimate from a third probe sequence transmitted over the network from the second device to the first device;

computing a fourth probe estimate from a fourth probe sequence transmitted over the network from the second device to the first device, the third probe sequence providing a different load to the network than the fourth probe sequence; and estimating a reverse sustainable capacity value in the network characterizing sustainable capacity of the network for data traffic from the second device and the first device based on the third probe estimate and the fourth probe estimate.

17. The computer program product of claim 14 wherein the first probe sequence includes probe packets periodically transmitted from the first device to the second device.

18. The computer program product of claim 14 wherein neither the first probe sequence nor the second probe sequence saturate the network.

19. The computer program product of claim 14 wherein the second probe sequence loads the network more than the first probe sequence.

20. The computer program product of claim 14 wherein the computer process further comprises:
generating a first probe sequence, wherein each probe packet in the first probe sequence has a unique signature.

21. The computer program product of claim 14 wherein the computer process further comprises:

timestamping each packet in the first probe sequence prior to transmission to the second network device.

22. The computer program product of claim 14 wherein the computer process further comprises:
timestamping each response to each probe packet in the first probe sequence after to reception of the probe packet from the second network device.

23. The computer program product of claim 14 wherein each probe estimate is an average roundtrip delay time.

24. The computer program product of claim 14 wherein each probe estimate is a median roundtrip delay time.

25. The computer program product of claim 14 wherein each probe estimate is a range of roundtrip delay times.

26. The computer program product of claim 14 wherein each probe estimate is a standard deviation of roundtrip delay times.

27. A system comprising:
a probe sequence generator that generates a first probe sequence and a second probe sequence;
a communication module that transmits the first probe sequence and the second probe sequence to a target, receives a first response sequence associated with the first probe sequence and a second response sequence associated with the second probe sequence; and computes a first probe estimate from the first probe sequence and a second probe estimate from the second probe sequence; and
a probe performance analyzer that estimates a sustainable capacity in the network characterizing sustainable capacity of the network for data traffic from the first device and the second device based on the first probe estimate and the second probe estimate; and
wherein the probe performance analyzer computes an algorithm substantially of the form:

$$SusCap_{est} = \delta m \frac{\hat{D}_2 - D_{min}}{\hat{D}_2 - \hat{D}_1}$$

wherein $SusCap_{est}$ represents the sustainable capacity value, $\delta m$ represents a load difference between the second probe sequence and the first probe sequence, $\hat{D}_2$ represents the second robe estimate, $\hat{D}_1$ represents the first probe estimate, and $D_{min}$ represents a minimum delay time of individual round-trip delay times associated with the first load probe sequence and the second load probe sequence.

28. The system of claim 27 wherein the sustainable capacity is further based on a minimum delay time of individual roundtrip delay times associated with the first probe sequence and the second probe sequence.

29. The system of claim 27 wherein the first probe sequence includes probe packets periodically transmitted from the first device to the second device.

30. The system of claim 27 wherein neither the first probe sequence nor the second probe sequence saturate the network.

31. The system of claim 27 wherein each probe estimate is an average roundtrip delay time.

32. The system of claim 27 wherein each probe estimate is a median roundtrip delay time.

33. The system of claim 27 wherein each probe estimate is a range of roundtrip delay times.

34. The system of claim 27 wherein each probe estimate is a standard deviation of roundtrip delay times.

35. A method comprising:
computing a first probe estimate from a first probe sequence transmitted over a network from a first device to a second device;
computing a second probe estimate from a second probe sequence transmitted over the network from the first device to the second device, the first probe sequence providing a different load to the network than the second probe sequence;
estimating a sustainable capacity of the network based on the first probe estimate and the second probe estimate; and
wherein the estimating operation comprises computing an algorithm substantially of the form:

$$SusCap_{est} = \delta m \frac{\hat{D}_2}{\hat{D}_2 - \hat{D}_1}$$

wherein $SusCap_{est}$ represents the sustainable capacity value, $\delta m$ represents a load difference between the second probe sequence and the first probe sequence, $\hat{D}_2$ represents the second probe estimate, and $\hat{D}_1$ represents the first probe estimate.

36. The method of claim 35 wherein the sustainable capacity is further based on a minimum delay time of individual roundtrip delay times associated with the first probe sequence and the second probe sequence.

37. The method of claim 35 wherein the sustainable capacity of the network relates to data traffic flowing from the first device to the second device, and further comprising:
computing a third probe estimate from a third probe sequence transmitted over the network from the second device to the first device;
computing a fourth probe estimate from a fourth probe sequence transmitted over the network from the second device to the first device, the third probe sequence providing a different load to the network than the fourth probe sequence; and
estimating a reverse sustainable capacity of the network for data traffic from the second device and the first device based on the third probe estimate and the fourth probe estimate.

38. A computer program product disposed on a computer readable storage media encoding a computer program for executing on a computer system a computer process, the computer process comprising:
computing a first probe estimate from a first probe sequence transmitted over a network from a first device to a second device;
computing a second probe estimate from a second probe sequence transmitted over the network from the first device to the second device, the first probe sequence providing a different load to the network than the second probe sequence; estimating a sustainable capacity of the network based on the first probe estimate and the second probe estimate; and
wherein the estimating operation comprises computing an algorithm substantially of the form:

$$SusCap_{est} = \delta m \frac{\hat{D}_2}{\hat{D}_2 - \hat{D}_1}$$

wherein $SusCap_{est}$ represents the sustainable capacity value, $\delta m$ represents a load difference between the second probe sequence and the first probe sequence, $\hat{D}_2$ represents the second probe estimate, and $\hat{D}_1$ represents the first probe estimate.

39. The computer program product of claim 38 wherein the sustainable capacity value is further based on a minimum delay time of individual roundtrip delay times associated with the first probe sequence and the second probe sequence.

40. The computer program product of claim 38 wherein the sustainable capacity of the network relates to data traffic flowing from the first device to the second device, and further comprising:
    computing a third probe estimate from a third probe sequence transmitted over the network from the second device to the first device;
    computing a fourth probe estimate from a fourth probe sequence transmitted over the network from the second device to the first device, the third probe sequence providing a different load to the network than the fourth probe sequence; and
    estimating a reverse sustainable capacity value in the network characterizing sustainable capacity of the network for data traffic from the second device and the first device based on the third probe estimate and the fourth probe estimate.

41. The computer program product of claim 38 wherein the first probe sequence includes probe packets periodically transmitted from the first device to the second device.

42. The computer program product of claim 38 wherein neither the first probe sequence nor the second probe sequence saturate the network.

43. The computer program product of claim 38 wherein the second probe sequence loads the network more than the first probe sequence.

44. The computer program product of claim 38 wherein the computer process further comprises:
    generating a first probe sequence, wherein each probe packet in the first probe sequence has a unique signature.

45. The computer program product of claim 38 wherein the computer process further comprises:
    timestamping each packet in the first probe sequence prior to transmission to the second network device.

46. The computer program product of claim 38 wherein the computer process further comprises:
    timestamping each response to each probe packet in the first probe sequence after to reception of the probe packet from the second network device.

47. The computer program product of claim 38 wherein each probe estimate is an average roundtrip delay time.

48. The computer program product of claim 38 wherein each probe estimate is a median roundtrip delay time.

49. The computer program product of claim 38 wherein each probe estimate is a range of roundtrip delay times.

50. The computer program product of claim 38 wherein each probe estimate is a standard deviation of roundtrip delay times.

51. A system comprising:
    a probe sequence generator that generates a first probe sequence and a second probe sequence;
    a communication module that transmits the first probe sequence and the second probe sequence to a target, receives a first response sequence associated with the first probe sequence and a second response sequence associated with the second probe sequence; and computes a first probe estimate from the first probe sequence and a second probe estimate from the second probe sequence; and
    a probe performance analyzer that estimates a sustainable capacity in the network characterizing sustainable capacity of the network for data traffic from the first device and the second device based on the first probe estimate and the second probe estimate; and
    wherein the probe performance analyzer computes an algorithm substantially of the form:

$$SusCap_{est} = \delta m \frac{\hat{D}_2}{\hat{D}_2 - \hat{D}_1}$$

wherein $SusCap_{est}$ represents the sustainable capacity value, $\delta m$ represents a load difference between the second probe sequence and the first probe sequence, $\hat{D}_2$ represents the second probe estimate, and $\hat{D}_1$ represents the first probe estimate.

52. The system of claim 51 wherein the sustainable capacity is further based on a minimum delay time of individual roundtrip delay times associated with the first probe sequence and the second probe sequence.

53. The system of claim 51 wherein the first probe sequence includes probe packets periodically transmitted from the first device to the second device.

54. The system of claim 51 wherein neither the first probe sequence nor the second probe sequence saturate the network.

55. The system of claim 51 wherein each probe estimate is an average roundtrip delay time.

56. The system of claim 51 wherein each probe estimate is a median roundtrip delay time.

57. The system of claim 51 wherein each probe estimate is a range of roundtrip delay times.

58. The system of claim 51 wherein each probe estimate is a standard deviation of roundtrip delay times.

* * * * *

UNITED STATES PATENT AND TRADEMARK OFFICE
CERTIFICATE OF CORRECTION

PATENT NO. : 7,689,686 B2  Page 1 of 1
APPLICATION NO. : 10/696780
DATED : March 30, 2010
INVENTOR(S) : Dinan S. Gunawardena et al.

It is certified that error appears in the above-identified patent and that said Letters Patent is hereby corrected as shown below:

In column 13, line 17, in Claim 1, delete "sequence" and insert -- sequence, --, therefor.

In column 13, line 18, in Claim 1, delete "robe" and insert -- probe --, therefor.

In column 13, line 21, in Claim 1, before "and" insert -- sequence --.

In column 15, line 45, in Claim 27, delete "robe" and insert -- probe --, therefor.

Signed and Sealed this
Seventeenth Day of May, 2011

David J. Kappos
*Director of the United States Patent and Trademark Office*